US009813815B2

(12) United States Patent
Pedersen et al.

(10) Patent No.: US 9,813,815 B2
(45) Date of Patent: Nov. 7, 2017

(54) METHOD OF WIRELESS TRANSMISSION OF DIGITAL AUDIO

(71) Applicant: GN HEARING A/S, Ballerup (DK)

(72) Inventors: Brian Dam Pedersen, Ringsted (DK); Thorkild Find Pedersen, Valby (DK)

(73) Assignee: GN HEARING A/S, Ballerup (DK)

( * ) Notice: Subject to any disclaimer, the term of this patent is extended or adjusted under 35 U.S.C. 154(b) by 72 days.

(21) Appl. No.: 14/303,399

(22) Filed: Jun. 12, 2014

(65) Prior Publication Data

US 2015/0341724 A1 Nov. 26, 2015

(30) Foreign Application Priority Data

May 20, 2014 (DK) .................................. 2014 70294
May 20, 2014 (EP) ..................................... 14169157

(51) Int. Cl.
*H04R 5/02* (2006.01)
*H04R 5/04* (2006.01)
*H04W 4/00* (2009.01)
*H04R 25/00* (2006.01)

(52) U.S. Cl.
CPC ............. *H04R 5/04* (2013.01); *H04R 25/552* (2013.01); *H04W 4/008* (2013.01); *H04R 25/554* (2013.01); *H04R 2225/55* (2013.01); *H04R 2420/07* (2013.01)

(58) Field of Classification Search
CPC ...... H04R 5/04; H04R 2420/07; H04W 4/008
USPC .......................................................... 381/300
See application file for complete search history.

(56) References Cited

U.S. PATENT DOCUMENTS

| 7,826,438 B1* | 11/2010 | Salhotra ................. H04L 1/188 370/345 |
| 2002/0041592 A1 | 4/2002 | Van Der Zee et al. |
| 2005/0089183 A1 | 4/2005 | Niederdrank et al. |
| 2005/0122927 A1* | 6/2005 | Wentink ............... H04B 7/2126 370/311 |
| 2006/0041675 A1 | 2/2006 | Sturrock et al. |
| 2013/0004002 A1 | 1/2013 | Duchscher et al. |
| 2013/0102251 A1 | 4/2013 | Linde et al. |
| 2014/0029701 A1 | 1/2014 | Newham et al. |

(Continued)

FOREIGN PATENT DOCUMENTS

EP          2 605 547 A1    6/2013
WO     WO 2005/034418 A1    4/2005

OTHER PUBLICATIONS

First Technical Examination and Search Report dated Aug. 27, 2014, for related Danish Patent Application No. PA 2014 70294, 8 pages.

(Continued)

*Primary Examiner* — Paul S Kim
(74) *Attorney, Agent, or Firm* — Vista IP Law Group, LLP

(57) ABSTRACT

A method of wireless communication of data sets includes: transmitting a first data set of a first data category from a transmitter for reception by a receiver; and re-transmitting the first data set at a time after the first data set is transmitted if there is an absence of an acknowledgement of receipt from the receiver, or transmitting a second data set of a second data category that is different from the first data category from the transmitter to the receiver at the time if there is a presence of the acknowledgement of receipt from the receiver.

18 Claims, 11 Drawing Sheets

(56) References Cited

U.S. PATENT DOCUMENTS

2014/0089756 A1* 3/2014 Obuchi .................. H04L 47/10
                                                        714/748

OTHER PUBLICATIONS

Extended European Search Report dated Feb. 9, 2015, for corresponding EP Patent Application No. 14169157.6, 9 pages.
Second Technical Examination Report—Intention to Grant dated Mar. 5, 2015, for corresponding Danish Patent Application No. PA 2014 70294, 2 pages.
European Communication pursuant to Article 94(3) EPC dated Sep. 30, 2016, for corresponding EP Patent Application No. 14169157.6, 4 pages.

* cited by examiner

METHOD OF WIRELESS TRANSMISSION OF DIGITAL AUDIO

RELATED APPLICATION DATA

This application claims priority to and the benefit of Danish Patent Application No. PA 2014 70294, filed on May 20, 2014, pending, and European Patent Application No. 14169157.6, filed on May 20, 2014, pending. The entire disclosures of both of the above applications are expressly incorporated by reference herein.

FIELD OF TECHNOLOGY

A new method of wireless communication of data with different priorities is provided, for example in compliance with a Bluetooth Low Energy (LE) standard. A new hearing device configured for wireless communication in accordance with the new method is also provided.

BACKGROUND

Bluetooth LE as defined by the Bluetooth Core Specification 4.1, or earlier versions, does not allow for audio transport. There are a number of limitations in the protocol as defined that means that audio transport is not feasible without changing certain protocol layers:
- The nature of the L2CAP channels as defined for LE— where a best effort approach for data transport with no timeouts or flushes on transmissions is defined—also means that it is next to impossible to do a real-time audio service over LE as defined.
- The lack of real-time transport means also means that stereo synchronization between two paired audio sinks (such as hearing aids) is next to impossible.
- The packet size means that the overhead for transmitting the required data rate for audio (typically 32-48 kbit/s) is very high.

SUMMARY

It is an object of the new method and hearing device to overcome the above-mentioned shortcomings.

Thus, a new method of wireless communication of data sets is provided, comprising:
a) transmitting a first data set of a first data category from a transmitter for reception by a receiver,
b) in absence of an acknowledgement of receipt from the receiver, re-transmitting the first data set,
c) in presence of the acknowledgement of receipt from the receiver, transmitting a second data set of a second data category that is different from the first data category from the transmitter to the receiver when the transmitter and receiver would have been connected for the re-transmission in absence of the acknowledgement, e.g. in the same connection event during which the first data set of the first data category was transmitted.

Further, a new method of wireless communication of data with different priorities is provided, comprising
a) transmitting a first data set with a first priority from a transmitter for reception by a receiver,
b) in absence of an acknowledgement of receipt from the receiver, re-transmitting the first data set with the first priority,
c) in presence of the acknowledgement of receipt from the receiver, transmitting a second data set with a second priority that is lower than the first priority from the transmitter to the receiver when the transmitter and receiver would have been connected for the re-transmission in absence of the acknowledgement.

The first data category may comprise audio data sets.

The second data category may comprise various control data, such as start, stop, codec negotiation, etc., compliant with a Bluetooth LE standard protocol, such as defined by the Bluetooth core specification 4.1, or earlier versions, and/or data from other devices, e.g. devices with sensors, such as environmental sensors, such as temperature sensors.

The first data set may be an audio data set. An audio data set comprises values of a digital audio signal, such as a sequence of discrete-time and discrete-amplitude digital audio signal values that represent continuous-time and continuous-amplitude values of an analogue audio signal that can be converted into acoustic sound. In other words, an audio data set contains digital data that are intended for conversion into sound at some point in time as is well-known in the art of streaming audio.

Preferably, audio data sets have a high priority ensuring transmission of the audio data sets before transmission of other types of data sets with lower priorities in order to ensure high fidelity, or at least acceptable, quality of sound generated based on the transmitted audio data sets.

A data set, including an audio data set, may be a data packet with two kinds of data, namely control information and data. The data is also known as payload or payload data. The control information provides information data that a network needs in order to deliver the data or payload to the intended receiver, for example: source and destination device addresses, error detection codes, and sequencing information. Typically, control information is found in packet headers and trailers, with payload data in between.

The method may further comprise
d) signalling from the transmitter to the receiver whether or not a data set with the second priority is awaiting transmission to the receiver, and
e) when no data set with the second priority is awaiting transmission to the receiver, abstaining from establishing the connection between the transmitter and receiver intended for transmission of a second data set with the second priority.

Information on whether or not a data set with the second priority is awaiting transmission to the receiver may be encoded into a single data byte, such as a single data bit.

The method may be compliant with a Bluetooth low energy standard, such as the Bluetooth Core Specification 4.1, or earlier versions, and, preferably, transmissions of audio data sets are performed in consecutive connection events.

The method may be utilized for audio streaming of, e.g., speech and music, in compliance with a Bluetooth low energy standard, such as the Bluetooth Core Specification 4.1, or earlier versions.

The method may further comprise allocating L2CAP channels for transmission of audio data sets, e.g. by allocating one L2CAP channel for control data relating to the audio data sets, and/or allocating one L2CAP channel for a first audio data set, and possibly allocating another L2CAP channel for a second audio data set.

Three fixed L2CAP channels may be allocated for audio transport:
1) Control data (start, stop, codec negotiation etc.)
2) Left audio data
3) Right audio data In a device that can receive one audio stream (left or right), e.g. a hearing aid, only channel 1) and 2) or channel 1) and 3) would be in use for that device. In a device with integrated stereo capabilities, e.g. a stereo headset, all three channels are used. The audio data sets can be both unidirectional or bidirectional depending on the application, the control data channel should allow for negotiation on that point.

Connection Configuration may for example be performed by:
1. The receiving device advertises its ability to receive prioritized and flushable L2CAP (PFL2CAP) data through a unique UUID.
2. The transmitting device discovers the receiving device; connects to it and queries the PFL2CAP service for its capabilities.
3. The receiving device responds with its PFL2CAP configuration. E.g. for audio, this could include which codec it provides and on which L2CAP channels it expects to receive which content and at which priority, e.g. (channel 127, High priority, Left side audio), (channel 128, High priority, Right side audio) and (channel 129, Low priority, audio control information).
4. The transmitting device acknowledges receipt by sending additional information about the data, e.g. information on content, codec and frame sizes, flush timeout, etc.
5. Both transmitting device and receiving device setup the new L2CAP channels and prepare for the audio stream and adjust the connection rate to match the specified frame rate multiplied by number of re-transmissions.

Transmitting device operation e.g. while streaming audio, may include:
1. The host of the transmitting device controller starts processing the audio stream and process the first audio frame by encoding and queuing it for immediate transmission on the designated L2CAP channel(s). It then proceeds to process the next audio frame.
2. Simultaneously, the control layer will try to transmit packets in order of priority. Upon transmission success, it will request the next packet from the host with a note of success. If the packet gets flushed due to timeout, it will also request the next packet but with a note of failure.
3. Audio control information from the host, e.g. volume change, will be queued in the designated L2CAP channel. The controller will sent the packet when there are no pending packets with higher priority to send.

The method may further comprise re-transmission of an audio data set in absence of acknowledgement of receipt from a receiver of the audio data set provided that the number of attempted re-transmissions of the same audio data set is below a predetermined maximum value, e.g. equal to two.

The number of attempted re-transmissions of one or more types of data may not be limited, i.e. no maximum value is allocated to these one or more types of data; or, in other words, the maximum value allocated to these one or more types of data is infinite, e.g. 0xFFFF.

Different types of data may have different predetermined maximum values of attempted re-transmissions, e.g. audio data sets may have the maximum value two while the maximum value for data sets with a lower priority than the priority of the audio data sets.

For example, the new method may implement L2CAP flush timeouts as also defined for Bluetooth Basic Rate (BR) L2CAP channels. Preferably, this timeout corresponds to two connection events after the data is posted over HCI (meaning that a first and retry event would be allowed for L2CAP audio) for the channels bearing audio data, whereas it would stay at 0xFFFF for other channels.

On a typical link, packets will be lost at a rate that is not suitable for audio. Hence, re-transmission is preferably permitted, and, preferably, take place at a different channel. Therefore the Bluetooth LE MD feature cannot be used for re-transmission. Thus, audio data sets with flush timeout set should only be attempted once within a connection interval. In order to allow for re-transmission, the connection interval must be half of the audio frame size, so if an audio frame is 10 ms, the connection interval should be 5 ms. This is facilitated using existing link layer control packets.

The MD feature may be used for transmission of lower priority data in the same connection event, but the receiving device may not honour the MD bit, e.g. a hearing aid will not honour the MD bit.

In order to lower power consumption of the receiver, the transmitter may be configured to set the MD bit in a high-priority packet to indicate that there is low priority data pending regardless of whether the transmitter will transmit the data after the high priority data in the same connection event or not. If there is no low priority data pending, the MD bit is reset. This allows the receiver to skip connection events that have no data in between successful transmission of high-priority audio data sets in response to the received value of the MD bit. Similarly, the transmitter is allowed to skip connection events with no pending data during audio streaming to save power and/or improve interoperability with other wireless services.

Note that when sending non-audio data sets, the lack of L2CAP flush timeout means that the link will be occupied until the data is acknowledged. This would in rare cases cause dropouts in the audio, which would have to be handled by packet loss concealment on the receiving side as for example disclosed in EP 2 605 547 A1.

The method may further comprise transmitting synchronization data from the transmitter to at least one receiver configured for reception of audio data sets, the synchronization data containing timing information relating to a transmission delay difference between at least two different receivers connected for reception of different audio data sets.

Determining the synchronization data may be based on ping transmission from the transmitter to the at least two different receivers, e.g. ping transmission utilizing a L2CAP control channel.

Preferably, during stereo audio streaming, the transmitter communicates a time offset between the links to the receiver leading in the link so that the received audio can be delayed accordingly for proper synchronization of the two stereo channels. The time offset may be determined with a network latency measurement implementing a ping over a control channel. This ping would allow a transmitter host to compute the time offset.

Stereo audio streaming may also be performed using one link. For example, during stereo audio streaming to a headphone, both left and right L2CAP channels may be transmitted with the same link, whereby both receiver and transmitter are kept simple. The Bluetooth LE MD feature may be utilized for this purpose, since the headphone can sustain higher radio duty cycle. In this way, the same connection event will carry information on both left and right channel, and the packet structure can be kept the same as the mono or dual-sink case. This simplifies implementation on both sides, since on the transmitter host side only the connection handle for the audio will need to change compared to the dual-sink case.

The following table outlines the required number of bytes required to hold audio data sets given a certain audio frame size in ms. The values are for an audio stream running at 48 kbit/s. A 32 kbit/s audio stream will be ⅔ of the requirement.

| Audio frame size [ms] | payload size [bytes] |
|---|---|
| 10 | 60 |
| 12.5 | 75 |
| 15 | 90 |
| 20 | 120 |

To keep overhead to a minimum, it is preferred to let the LL MTU size match the L2CAP MTU plus header and MIC and be equal to the required payload size so that a method or controller implementing L2CAP audio preferably support long packets.

Advantageously, the new method facilitates transmission of audio data sets utilizing Bluetooth LE utilizing extensions of the Bluetooth LE control and link layer in a limited way, e.g. operations relating to security and link setup are performed as specified in Bluetooth core specification.

A hearing device is also provided having a communication controller that is configured for operation according to the new method according to any of the appended claims.

The hearing device may be a hearing aid, such as a BTE, RIE, ITE, ITC, CIC, etc., a binaural hearing aid, an Ear-Hook, In-Ear, On-Ear, Over-the-Ear, Behind-the-Neck, Helmet, Headguard, etc., headset, headphone, earphone, ear defender, earmuff, etc.

Preferably, the communication controller is configured for audio transmission and/or reception of audio with Bluetooth LE L2CAP, and preferably, the communication controller is configured to Support L2CAP flush timeout=2
Support prioritized L2CAP traffic
Support LL packet sizes up to 120 bytes, depending on choice of bitrate and audio frame size.

Thus, a new hearing aid is provided that is capable of performing wireless communication in compliance with a Bluetooth LE standard protocol.

The new hearing aid may comprise
an input transducer configured to output an audio signal based on a signal applied to the input transducer and representing sound,
a hearing loss processor configured to compensate a hearing loss of a user of the hearing aid and output a hearing loss compensated audio signal, e.g., the hearing aid may aim to restore loudness, such that loudness of the applied signal as it would have been perceived by a normal listener substantially matches the loudness of the hearing loss compensated signal as perceived by the user,
an output transducer, such as a receiver, an implanted transducer, etc., configured to output an auditory output signal based on the hearing loss compensated audio signal that can be received by the human auditory system, whereby the user hears the sound, and
the communication controller.

A transducer is a device that converts a signal applied to the transducer in one form of energy to a corresponding output signal in another form of energy.

The input transducer may comprise a microphone that converts an acoustic signal applied to the microphone into a corresponding analogue audio signal in which the instantaneous voltage of the audio signal varies continuously with the sound pressure of the acoustic signal.

The input transducer may also comprise a telecoil that converts a varying magnetic field at the telecoil into a corresponding varying analogue audio signal in which the instantaneous voltage of the audio signal varies continuously with the varying magnetic field strength at the telecoil. Telecoils may be used to increase the signal to noise ratio of speech from a speaker addressing a number of people in a public place, e.g. in a church, an auditorium, a theatre, a cinema, etc., or through a public address systems, such as in a railway station, an airport, a shopping mall, etc. Speech from the speaker is converted to a magnetic field with an induction loop system (also called "hearing loop"), and the telecoil is used to magnetically pick up the magnetically transmitted speech signal.

The input transducer may further comprise at least two spaced apart microphones, and a beamformer configured for combining microphone output signals of the at least two spaced apart microphones into a directional microphone signal.

The input transducer may comprise one or more microphones and a telecoil and a switch, e.g. for selection of an omni-directional microphone signal, or a directional microphone signal, or a telecoil signal, either alone or in any combination, as the audio signal.

Typically, the analogue audio signal is made suitable for digital signal processing by conversion into a corresponding digital audio signal in an analogue-to-digital converter whereby the amplitude of the analogue audio signal is represented by a binary number. In this way, a discrete-time and discrete-amplitude digital audio signal in the form of a sequence of digital values represents the continuous-time and continuous-amplitude analogue audio signal.

Throughout the present disclosure, the "audio signal" may be used to identify any analogue or digital signal forming part of the signal path from the output of the input transducer to an input of the hearing loss processor.

Throughout the present disclosure, the "hearing loss compensated audio signal" may be used to identify any analogue or digital signal forming part of the signal path from the output of the hearing loss processor to an input of the output transducer possibly via a digital-to-analogue converter.

The hearing aid may comprise a transceiver comprising both a wireless transmitter and a wireless receiver. The transmitter and receiver may share common circuitry and/or a single housing. Alternatively, the transmitter and receiver may share no circuitry, and the wireless communication unit may comprise separate devices with the transmitter and the receiver, respectively.

The hearing aid may advantageously be incorporated into a binaural hearing aid system, e.g. wherein two hearing aids are interconnected utilizing the Bluetooth LE standard protocol for digital exchange of data, such as audio signals, signal processing parameters, control data, such as identification of signal processing programs, etc., etc., and optionally interconnected with other devices, such as a hand-held device, such as a tablet computer, a smart phone, e.g. an IPhone, an Android phone, a Windows phone, etc., a remote control, etc.

Typically, only a limited amount of power is available from the power supply of a hearing aid. For example, power is typically supplied from a conventional $ZnO_2$ battery in a hearing aid.

In the design of a hearing aid, the size and the power consumption are important considerations.

Signal processing in the new hearing aid may be performed by dedicated hardware or may be performed in one or more signal processors, or performed in a combination of dedicated hardware and one or more signal processors.

Likewise, the operations of the communication controller may be performed by dedicated hardware or may be performed in one or more processors, or performed in a combination of dedicated hardware and one or more processors.

As used herein, the terms "processor", "signal processor", "controller", "system", etc., are intended to refer to CPU-related entities, either hardware, a combination of hardware and software, software, or software in execution.

For example, a "processor", "signal processor", "controller", "system", etc., may be, but is not limited to being, a process running on a processor, a processor, an object, an executable file, a thread of execution, and/or a program.

By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry.

Also, a processor (or similar terms) may be any component or any combination of components that is capable of performing signal processing. For examples, the signal processor may be an ASIC processor, a FPGA processor, a general purpose processor, a microprocessor, a circuit component, or an integrated circuit.

A method of wireless communication of data sets includes: transmitting a first data set of a first data category from a transmitter for reception by a receiver; and re-transmitting the first data set at a time after the first data set is transmitted if there is an absence of an acknowledgement of receipt from the receiver, or transmitting a second data set of a second data category that is different from the first data category from the transmitter to the receiver at the time if there is a presence of the acknowledgement of receipt from the receiver.

Optionally, the first data set has a first priority, and the second data set has a second priority that is lower than the first priority.

Optionally, the method further includes: signalling from the transmitter to the receiver whether or not a data in the second data set is awaiting transmission to the receiver; and when no data in the second data set is awaiting transmission to the receiver, abstaining from establishing a connection between the transmitter and the receiver for transmission of the second data set.

Optionally, information on whether or not the data of the second data set is awaiting transmission to the receiver is encoded into a single data bit.

Optionally, the transmissions of the first and second data sets, and receptions of the first and second data sets, are in compliance with a Bluetooth low energy standard.

Optionally, the method further includes allocating L2CAP channels for the transmission of the first and second data sets.

Optionally, the first data set comprises control data relating to an audio data set.

Optionally, the first data set comprises a first audio data set, and one of the L2CAP channels is allocated for the first audio data set.

Optionally, the second data set comprises a second audio data set, and another one of the L2CAP channels is allocated for the second audio data set.

Optionally, the act of re-transmitting the first data set is performed as long as a number of attempted re-transmission(s) of the first data set is below a first predetermined maximum value.

Optionally, the first predetermined maximum value is two.

Optionally, the first predetermined maximum value corresponds with the first data category, and wherein the second data category has a corresponding second predetermined maximum value of attempted re-transmission(s) that is different from the first predetermined maximum value.

Optionally, the receiver is a first receiver, and the method further comprises transmitting synchronization data from the transmitter to the first receiver or to the first receiver and a second receiver, the synchronization data containing timing information relating to a transmission delay difference between the first and second receivers.

Optionally, the method further includes determining the synchronization data based on ping transmission from the transmitter to the first and second receivers.

Optionally, the ping transmission utilizes a L2CAP control channel.

Optionally, at the time, the first data set is re-transmitted, and the second data set is not transmitted; and wherein the method further comprises transmitting the second data set from the transmitter to the receiver at another time that is after the time at which the first data set is re-transmitted.

A hearing device includes: a communication controller configured to control a transmitter to transmit a first data set of a first data category for reception by a receiver; wherein the communication controller is configured to control the transmitter to re-transmit the first data set at a time after the first data set is transmitted if there is an absence of an acknowledgement of receipt from the receiver, or to transmit a second data set of a second data category that is different from the first data category to the receiver at the time if there is a presence of the acknowledgement of receipt from the receiver.

Optionally, the hearing device is a hearing aid.

Optionally, at the time, the first data set is re-transmitted, and the second data set is not transmitted; and wherein the communication controller is further configured to control the transmitter to transmit the second data set to the receiver at another time that is after the time at which the first data set is re-transmitted.

Other and further aspects and features will be evident from reading the following detailed description.

BRIEF DESCRIPTION OF THE DRAWINGS

In the following, the new method and hearing aid is explained in more detail with reference to the drawings, wherein FIG. 1 schematically illustrates a binaural hearing aid system receiving audio streaming from a smartphone in accordance with the new method, FIG. 2 schematically illustrates an example of transmission of audio data set in accordance with the new method, FIG. 3 schematically illustrates another example of transmission of audio data set in accordance with the new method, FIG. 4 schematically illustrates yet another example of transmission of audio data set in accordance with the new method, FIG. 5 schematically illustrates still another example of transmission of audio data set in accordance with the new method, FIG. 6 schematically illustrates yet still another example of transmission of audio data set in accordance with the new method, FIG. 7 schematically illustrates yet another example of transmission of audio data set in accordance with the new method.

DETAILED DESCRIPTION OF EMBODIMENTS

Figure 1:
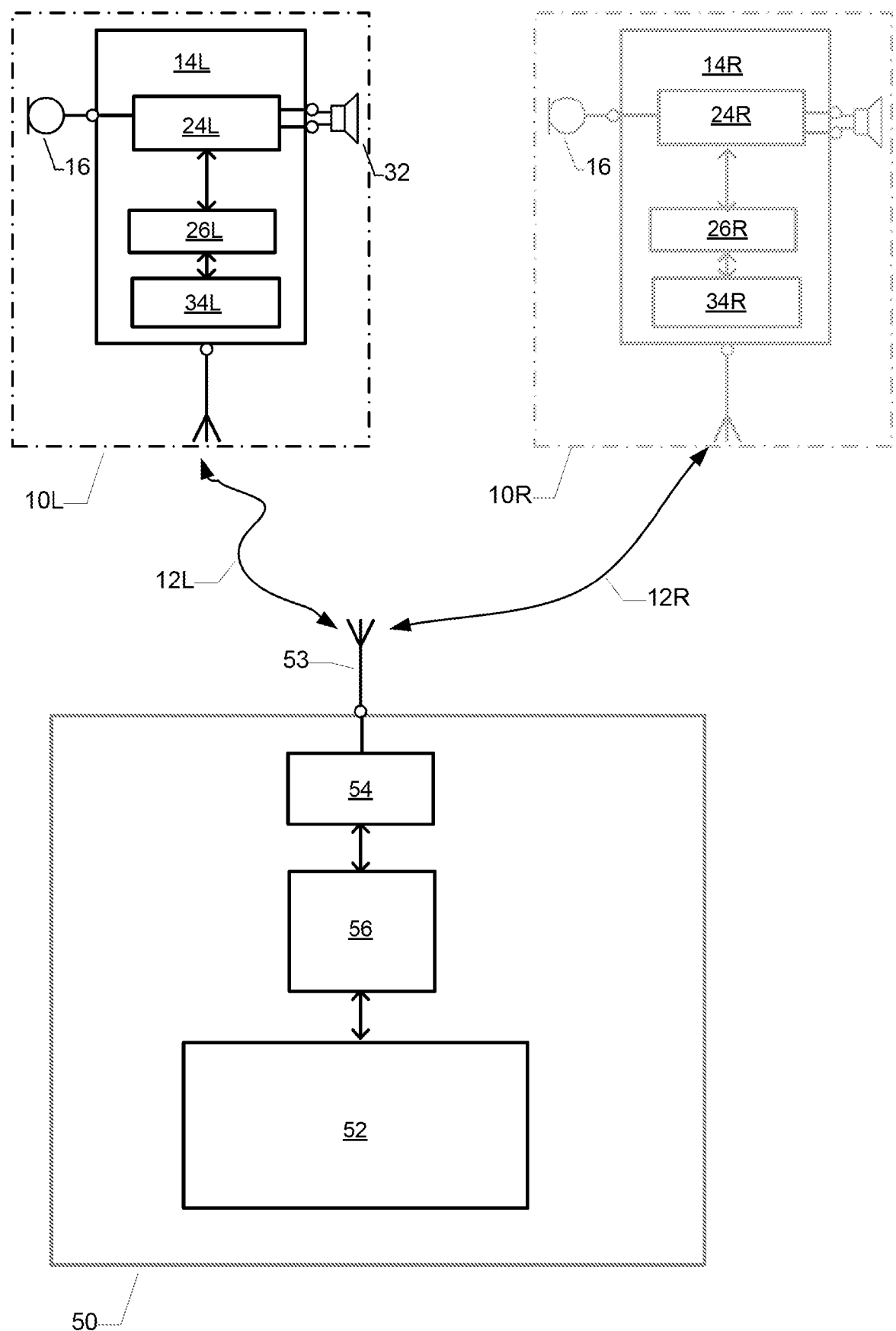

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated feature needs not have all the aspects or advantages shown. An aspect or an advantage described in conjunction with a particular feature is not necessarily limited to that feature and can be practiced in any other features even if not so illustrated or if not so explicitly described.

In the following, various examples of the new method and hearing device are illustrated. The new method and hearing device according to the appended claims may, however, be embodied in different forms and should not be construed as limited to the examples set forth herein.

FIG. 1 schematically illustrates a binaural hearing aid system comprising a left ear hearing aid 10L and a right ear hearing aid 10R, each of which comprises a wireless communication unit for connection to another audio-enabled communication device such as a smartphone or mobile phone, an audio-enabled tablet, a cordless phone, a TV-set etc. In the present embodiment, each of the left ear and right ear hearing aids 10L, 10R is connected to a smartphone 50 via respective wireless communication links 12L, 12R. The skilled person will understand that the binaural hearing aid system may comprise only a single hearing aid such as 10L in other embodiments of the system such the right hearing aid 10R is optional.

A unique ID identifies every device of the binaural hearing aid system. The illustrated binaural hearing aid system is configured to generally operate in accordance with Bluetooth Low Energy (Bluetooth LE) for example according to the Bluetooth Core Specification Version 4.1. Hence, the illustrated binaural hearing aid system is configured to operate in 2.4 GHz industrial scientific medical (ISM) band and comprises 80 frequency channels of 1 MHz bandwidth in accordance with Bluetooth LE. However, Bluetooth LE controllers of the wireless communication units of each of the left and right ear hearing aids 10L, 10R and the smartphone 50 have been modified to enable transmission of real-time audio data sets through each of the wireless communication links 12L, 12R as explained in further detail below.

The left hearing aid 10L and the optional right hearing aid 10R may be substantially identical, expect for the above-described unique ID such that the following description of the features of the left hearing aid 10L also applies to the right hearing aid 10R. The left hearing aid 10L may comprise a $ZnO_2$ battery (not shown) that is connected for supplying power to the hearing aid circuit 14. The left hearing aid 10L comprises an input transducer in the form of a microphone 16. The microphone 16 outputs an analogue or digital audio signal based on an acoustic sound signal arriving at the microphone 16 when the left hearing aid 10L is operating. If the microphone 16 outputs an analogue audio signal the hearing aid circuit 14 may comprise an analogue-to-digital converter (not shown) which converts the analogue audio signal into a corresponding digital audio signal for digital signal processing in the hearing aid circuit 14. In particular in a hearing loss processor 24L that is configured to compensate a hearing loss of a user of the left hearing aid 10. Preferably, the hearing loss processor 24L comprises a dynamic range compressor well-known in the art for compensation of frequency dependent loss of dynamic range of the user often termed recruitment in the art. Accordingly, the hearing loss processor 24L outputs a hearing loss compensated audio signal to a loudspeaker or receiver 32. The loudspeaker or receiver 32 converts the hearing loss compensated audio signal into a corresponding acoustic signal for transmission towards an eardrum of the user. Consequently, the user hears the sound arriving at the microphone; however, compensated for the user's individual hearing loss. The hearing aid may be configured to restore loudness, such that loudness of the hearing loss compensated signal as perceived by the user wearing the hearing aid 10 substantially matches the loudness of the acoustic sound signal arriving at the microphone 16 as it would have been perceived by a listener with normal hearing.

The hearing aid circuit 14 further includes a wireless communication unit which comprises a radio portion or circuit 34L that is configured to communicate wirelessly with the smartphone 50. The wireless communication unit comprises a Bluetooth LE controller 26L performing the various communication protocol related tasks and possibly other tasks. The operation of the left hearing aid 10L may be controlled by a suitable operating system. The operating system may be configured to manage hearing aid hardware and software resources, e.g. including the hearing loss processor 24L and possible other processors and associated signal processing algorithms, the wireless communication unit, certain memory resources etc. The operating system may schedule tasks for efficient use of the hearing aid resources and may also include accounting software for cost allocation, including power consumption, processor time, memory locations, wireless transmissions, and other resources.

The operating system controls the radio circuit 34L to perform wireless communication with the smartphone 50 in accordance with the modified and therefore audio-enabled Bluetooth LE protocol. The smartphone 50 may operate as a master device and the left hearing aid 10L as a slave in connection with bi-directional data communication between the devise under the modified Bluetooth LE protocol.

The smartphone 50 comprises a radio portion or circuit 54 that is configured to communicate wirelessly with the corresponding radio portion or circuit 34L of the left hearing aid 10L. The smartphone 50 also comprises a wireless communication unit which comprises a Bluetooth LE controller 56 performing the various communication protocol related tasks in accordance with the modified Bluetooth LE protocol and possibly other tasks. Data packets or data sets for transmission over the wireless communication link 12L are supplied by the Bluetooth LE controller 56 to the radio circuit 54. Data packets received by the radio portion or circuit 54 via RF antenna 53 are forwarded to the Bluetooth LE controller 56 for further data processing. The skilled person will appreciate that the smartphone 50 typically will include numerous additional hardware and software resources in addition to those schematically illustrated as is well-known in the art of mobile phones.

Figure 2:
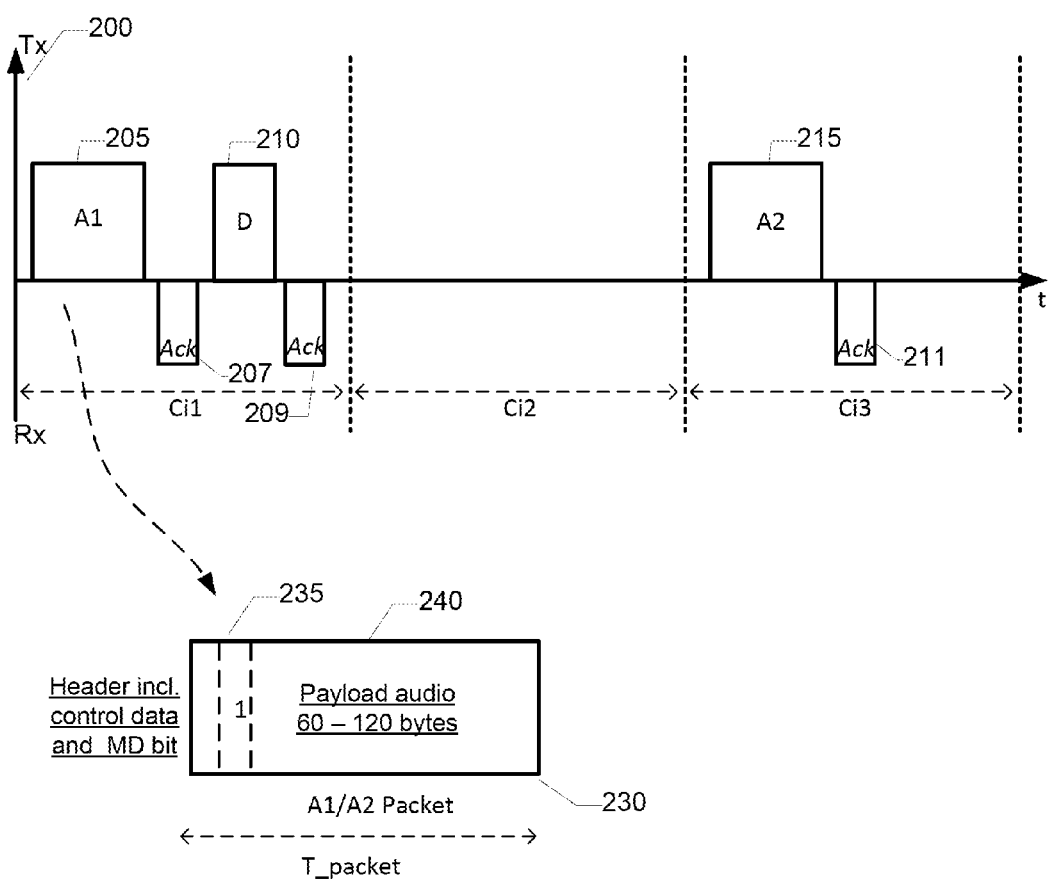

FIG. 2 is a first timing diagram 200 illustrating the new method of wireless communication of data sets with different priorities, e.g., between the left ear hearing aid 10L and the smartphone 50 discussed above, e.g., with the smartphone 50 configured as a master and the hearing aid 10L as a slave.

FIG. 2 illustrates operating conditions of the wireless communication link (12L in FIG. 1) with low interfering electromagnetic noise in the relevant data channels such that transmission of each data packet or data set from the transmitter is successful at the first transmission attempt and hence there is no need for re-transmission.

Consecutive connection events on the wireless communication link are indicated by Ci1, Ci2, Ci3, etc. along time axis t. The skilled person will understand that the illustrated adjacent connection events such as Ci1 and Ci2 may be separated by a considerable sleep time period for example up till 4 seconds in accordance with a Bluetooth LE protocol. During these sleep time periods, the radio circuit 34L of the left hearing aid 10L and the radio circuit 54 of the smartphone 50 may both be powered down to reduce power consumption. A connection event may have a duration or connection interval between 5 ms and 10 ms. The connection interval of each connection event is preferably selected as one-half of a selected audio frame size of audio data sets transmitted across the wireless communication link.

Table 2 below outlines the required number of bytes to hold audio data given a certain audio frame size in milliseconds. The listed values are for an audio stream running at 48 kbit/s. A 32 kbit/s audio stream will be ⅔ of the requirement.

| Audio frame size [ms] | payload size [bytes] |
|---|---|
| 10 | 60 |
| 12.5 | 75 |
| 15 | 90 |
| 20 | 120 |

As illustrated in FIG. 2 by symbols "A" and "D" of data packets 205, 210, 215 or data sets, two types of data with different priorities are transmitted through the wireless communication link. Data packets designated A1 and A2 have first priority data and data packet D has a second priority that is lower than the first priority. In the illustrated example, the first or high priority data packets, 205, 215 comprises audio data sets and the lower priority data packet 210 comprises various control data such as start, stop, codec negotiation, etc., compliant with the Bluetooth LE protocol according to the Bluetooth core specification 4.1, or earlier versions. The data structure of each of the high priority data packets A1, A2 is illustrated by data packet 230. The high priority data packet 230 comprises a header section 235 which may comprise 2 bytes. The high priority data packet 230 further comprises the above discussed payload data 240 which may comprise between 60 and 120 bytes of audio data depending on the audio frame size. A payload data size of 60 bytes leads to a length of about 1.5 ms for each of the high priority data packets which fits into the respective time windows of the connection events. The header section 235 preferably comprises a so-called more data (MD) field or bit, as illustrated by symbol "1". This MD field indicates whether there is low priority data packet D pending. The Bluetooth LE controller 56 of the transmitting device sets this MD bit if there is a low priority data packet D pending and resets the MD bit to "0" if there is no low priority data D pending. The Bluetooth LE controller 56 is preferably configured to set or reset the MD bit regardless of whether or not the transmitting device will actually transmit the low priority data packet D after the high priority data packet A1 in the same connection event Ci1 or not. This feature allows the receiving device to skip or eliminate connection events where no low priority data packet D is pending in-between successful high-priority data packet connection events by inspecting the MD bit.

The lower priority data packet D may have a length of 37 bytes. To illustrate the transmission sequence of the high priority and low priority data packets by the transmitting device, a first high priority data packet A1 is initially transmitted. Thereafter, an operation mode of the radio circuit 54 of the transmitting device is reversed from a transmitting mode to a receiving mode during a short pause of for example length of about 150 μs. Hence, the radio circuit 54 of the transmitting device comprises a Bluetooth transceiver. In the receiving mode, the radio circuit 54 of the transmitting device monitors the communication link and listens for an acknowledgement receipt signal transmitted from the receiving device, i.e. left ear hearing aid 10L in the present situation, which confirms that the high priority data packet A1 has been correctly received. The receipt of this acknowledgement signal or packet is illustrated by packet or signal 207 marked "Ack". Since, the previously discussed MD bit is set to "1" in the header 235 of the high priority data packet A1, a low priority data packet D is pending and awaiting transmission. The transmitting device therefore transmits the pending low priority data packet D 210 as illustrated and after another short pause, a second acknowledgement signal or packet 209 is received as illustrated.

The Bluetooth LE controller 26L of the receiving device has now safely received both the high priority data packet A1 and the low priority data packet D. The Bluetooth LE controller 26L can therefore safely abandon or skip the following connection event Ci2 which is otherwise used for re-transmission of the high priority data packet A1 as explained below in further detail. Hence, the wireless transceiver of the receiving device is not turned on during the second connection event Ci2 and thereby saves considerable power relative to receiving and transmitting data packets.

During the third connection event Ci3, a new high priority data packet A2 (215) is transmitted to the receiving device which thereafter acknowledges safe receipt by returning acknowledgement packet 211 marked "Ack" to the transmitting device. The MD bit may be set to "0" in the header 235 of the second high priority data packet A2 indicating that no low priority data packet D is pending. The Bluetooth LE controller 26L of the receiving device has now safely received the high priority data packet A2 and by inspection of the MD bit of the header of the packet A2 conclude that there is no low priority data packet D pending. Hence, the Bluetooth LE controller 26L therefore abandons or skips a subsequent connection event Ci4 (not shown).

Figure 3:
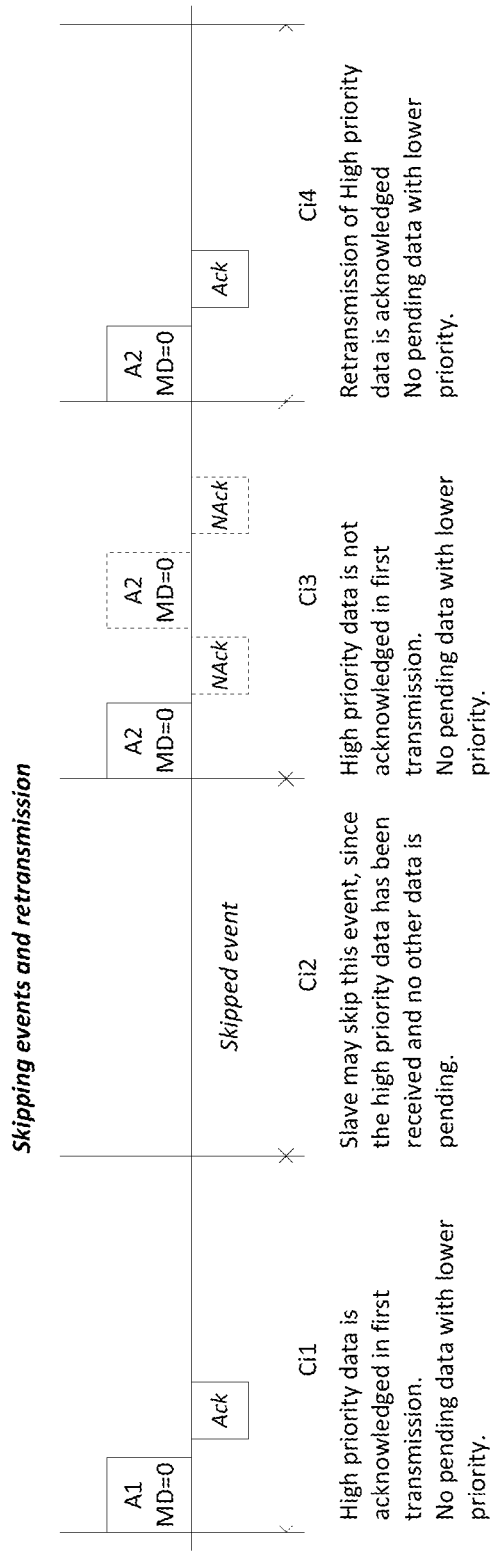

FIG. 3 shows another exemplary timing diagram 300 illustrating the new method of wireless communication of data sets with different priorities. FIG. 3 illustrates operating conditions, e.g., of the wireless communication link 12L in FIG. 1, with a certain amount of interfering electromagnetic noise in the relevant data channels such that transmission of individual data packets or data sets from the transmitter to the receiver fails from time to time.

As described above in connection with FIG. 2, consecutive connection events of the wireless communication link are indicated by Ci1, Ci2, Ci3, Ci4, etc., along the time axis t. The skilled person will understand that the illustrated adjacent connection events, such as Ci1 and Ci2, may be separated by a considerable sleep time period or inactive period for example up till 4 seconds in accordance with Bluetooth LE protocol.

In FIG. 3, the transmission sequence of the high priority and low priority data packets A1, A2 and D, respectively, by the transmitting device begins with transmission of a first high priority audio data packet A1. Thereafter, the transmitting device switches operation to the previously discussed receiving mode and monitors the communication link for an acknowledgement of receipt signal or package transmitted by the receiving device, i.e. the left ear hearing aid 10L. In the illustrated communication sequence, the transmission of the high priority data packet A1 in connection event Ci1 is successful, and the receiving device transmits the acknowledgement signal or packet Ack. No low priority data packet D is pending and awaiting transmission, so the previously discussed MD bit is set to "0" in the header of the high priority data packet A1 as indicated by "MD=0" in data packet A1 of FIG. 3.

Since the high priority data has been received and no low priority data packet D is pending, the receiving device skips the next connection event Ci2, whereby power consumption is lowered in the receiving device.

In the third connection event Ci3, high priority data packet A2 is transmitted for the first time with limited success. The receiving device receives a data packet; however, a transmission error is detected, e.g. with CRC, and the receiving device transmits a not-acknowledge signal or data packet "Nack", possibly with the previously discussed MD bit set to "1", to request a re-transmission of the data packet within the same connection event Ci3. Thus, the data packet A2 is re-transmitted within the same connection event Ci3; however, in this example, also with the same result as before with detection of a transmission error in the receiving device. Optionally, the receiving device does not transmit the second "Nack" signal or packet in order to save power.

Subsequently, a first re-transmission in a subsequent connection event Ci4 is performed and this time the receiving device successfully receives the data packet A2, and the receiving device therefore transmits an acknowledge signal or packet to the transmitting device. No low priority data packet D is pending as indicated by "MD=0" in data packet A2 of FIG. 3.

In the event that a transmitted data packet is lost, the receiving device does not transmit any signal, such as the "Nack" signal, and in absence of a signal from the receiving device, the connection event is preferably closed in order to save power, and therefore, preferably, no re-transmission takes place in the same connection event during which the original transmission of the data packet was performed.

Figure 4:
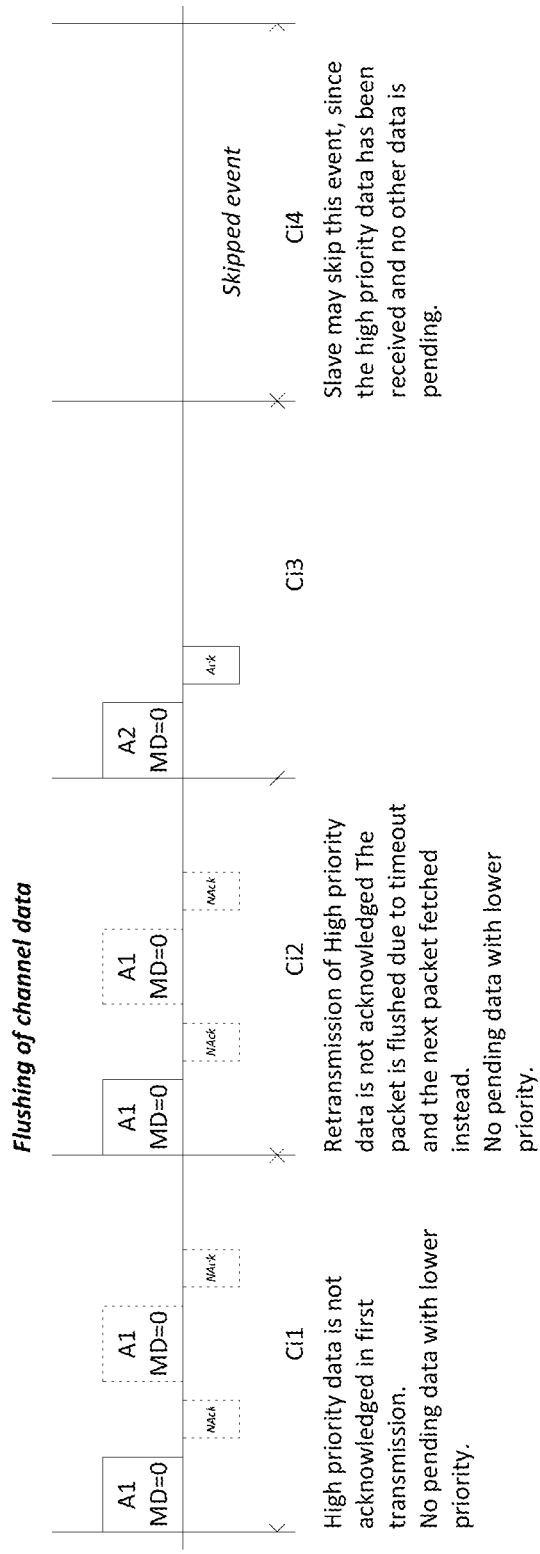

FIG. 4 shows another exemplary timing diagram 400 illustrating the new method of wireless communication of data sets with different priorities wherein the maximum number of re-transmissions of a high priority data packet in a new connection event is set to one. FIG. 4 illustrates operating conditions, e.g., of the wireless communication link 12L in FIG. 1, with a certain amount of interfering electromagnetic noise in the relevant data channels such that transmission of individual data packets or data sets from the transmitter to the receiver fails from time to time.

As in FIG. 3, consecutive connection events of the wireless communication link are indicated by Ci1, Ci2, Ci3, Ci4, etc., along the time axis t. The skilled person will understand that the illustrated adjacent connection events, such as Ci1 and Ci2, may be separated by a considerable sleep time period or inactive period for example up till 4 seconds in accordance with Bluetooth LE protocol.

In the first connection event Ci1, high priority data packet A1 is transmitted for the first time with limited success. The receiving device receives a data packet; however, a transmission error is detected, e.g. with CRC, and the receiving device transmits a not-acknowledge signal or data packet "Nack", possibly with the previously discussed MD bit set to "1", to request a re-transmission of the data packet A1 within the same connection event Ci1. Thus, the data packet A1 is re-transmitted within the same connection event Ci1; however, in this example, also with the same result as before with detection of a transmission error in the receiving device. Optionally, the receiving device does not transmit the second "Nack" signal or packet in order to save power.

Subsequently, a first re-transmission in a subsequent connection event Ci2 is performed; however, still with detection of a transmission error in the receiving device and transmission of a not-acknowledge signal or data packet "Nack", possibly with the previously discussed MD bit set to "1", to request a re-transmission of the data packet A1 within the same connection event Ci2. Thus, the data packet A1 is re-transmitted within the same connection event Ci2; however, again with the result of detection of a transmission error in the receiving device.

As a result, the data packet A1 is flushed due to time out, and the transmitting device acquires the next high priority data packet A2 for transmission in connection event Ci3. The transmission is successful, and the receiving device acknowledges receipt of data packet A2. No data packets with a lower priority is awaiting transmission in the transmitting device, so that the MD bit is set to "0" in the header of the second high priority data packet A2, and thus, the receiving device skips the fourth connection event Ci4 thereby saving power.

In the illustrated example, the predetermined maximum number of re-transmissions in a new connection event of a high priority data packet is one, but a higher maximum value may be selected, for example 2, 3 or 4. Also, the transmitting device may be configured to re-transmit a low priority data packet until acknowledgement of receipt is received from the receiving device, i.e. without limiting the number of re-transmissions to a selected maximum number.

Limiting the number of re-transmissions of a particular high priority data packet to the selected maximum number facilitates maintenance of the real-time property of received data packets at the receiving device. If the number of re-transmission of a particular high priority data packet reaches the predetermined maximum number without success, the transmitting device flushes or overwrites the particular high priority data packet with a new high priority data packet that, e.g., represents current audio content, and proceeds to transmit the new high priority data packet. The loss of the former high priority data packet may be concealed by the receiving device by a suitable packet loss concealment algorithm executed, e.g., by the hearing loss processor 24L of the left hearing aid.

In the event that a transmitted data packet is lost, the receiving device does not transmit any signal, such as the "Nack" signal, and in absence of a signal from the receiving device, the connection event is preferably closed in order to save power, and therefore, preferably, no re-transmission takes place in the same connection event as the original transmission of the data packet.

Figure 5:
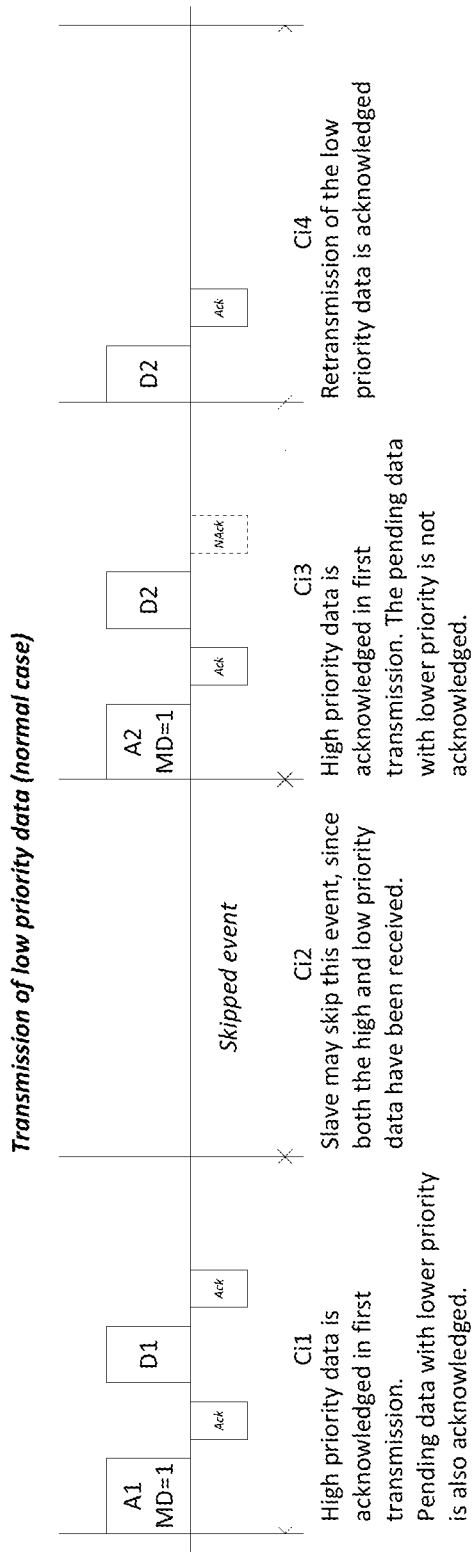

In the timing diagram of FIG. 5, a high priority data packet A1 is transmitted successfully in connection event Ci1, and the receiving device acknowledges safe receipt by transmission of an acknowledgement signal or packet "Ack" to the transmitting device. The MD bit is set to "1" in the header of the first high priority data packet A1 indicating that a new low priority data packet D1 is awaiting transmission to the receiving device, and the transmitting device proceeds to transmit the low priority data packet D1 during the same connection event Ci1. The transmission is successful and the receiving device acknowledges receipt. Since the receiving device successfully received both the high priority data packet A1 and the low priority data packet D1, the receiving device skips the second connection event Ci2, whereby power in the receiving device is saved.

In connection event cI3, a second high priority data packet A2 is transmitted successfully to the receiving device, and the receiving device acknowledges receipt. The MD bit is set to "1" in the header of the second high priority data packet A2 indicating that a new low priority data packet D2 is awaiting transmission to the receiving device, and the transmitting device proceeds to transmit the low priority data packet D2 during the same connection event Ci3. The transmission of the second low priority data packet D2 is unsuccessful and the receiving device does not acknowledge receipt as indicated by the dashed box "Nack". In the event that the data packet D2 is lost, the receiving device does not transmit anything to the transmitting device, and in the event that the receiving device receives the data packet D2, but a transmission error is detected, the receiving device may transmit the "Nack" signal.

Since no high priority data sets or packets are awaiting transmission to the receiving device, the transmitting device proceeds to make a re-transmission of the second data packets D2 with low priority during the fourth connection event Ci4, and this time with success.

Figure 6:
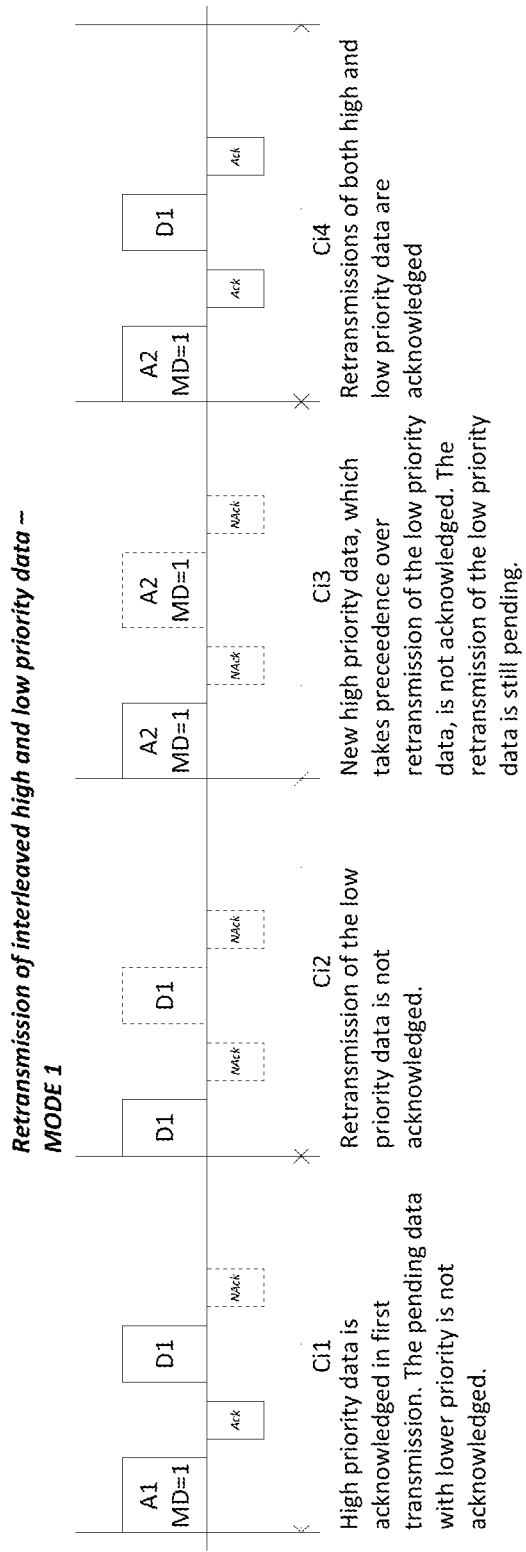

In FIG. 6, a high priority data packet A1 is transmitted successfully in connection event Ci1, and the receiving device acknowledges safe receipt by transmission of an acknowledgement signal or packet "Ack" to the transmitting device. The MD bit is set to "1" in the header of the first high priority data packet A1 indicating that a new low priority data packet D1 is awaiting transmission to the receiving device, and the transmitting device proceeds to transmit the low priority data packet D1 during the same connection event Ci1. The transmission of low priority data packet D2 fails, and the receiving device does not acknowledge receipt as indicated by the dashed box "Nack". In the event that the data packet D1 is lost, the receiving device does not transmit anything to the transmitting device, and in the event that the receiving device receives the data packet D1, but a transmission error is detected, the receiving device may transmit the "Nack" signal.

Since no high priority data sets or packets are awaiting transmission to the receiving device, the transmitting device proceeds to make a re-transmission of the second data packet D1 with low priority during the second connection event Ci2; however, transmission fails in connection event Ci2. In connection event Ci3, a new high priority data packet A2 is transmitted unsuccessfully and re-transmitted as already explained above. Subsequent to the successful re-transmission of the high priority data packet A2, the low priority data packet D1 is finally successfully transmitted to the receiver in connection event Ci4.

Figure 7:
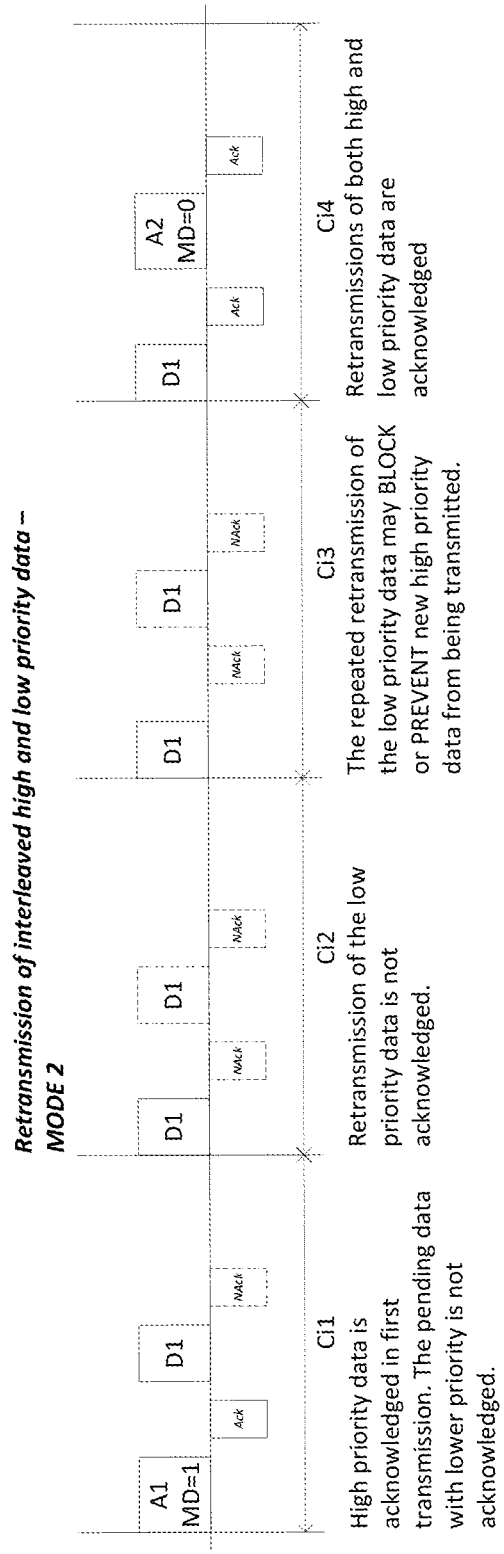

FIG. 7 illustrates that the priority of a data packet that is awaiting re-transmission may be increased, e.g. as a function of the number of failed re-transmission attempts, and may obtain a priority higher than a data packet with a high priority.

In FIG. 7, a high priority data packet A1 is transmitted successfully in connection event Ci1, and the receiving device acknowledges safe receipt by transmission of an acknowledgement signal or packet "Ack" to the transmitting device. The MD bit is set to "1" in the header of the first high priority data packet A1 indicating that a new low priority data packet D1 is awaiting transmission to the receiving device, and the transmitting device proceeds to transmit the low priority data packet D1 during the same connection event Ci1. The transmission of low priority data packet D2 fails, and the receiving device does not acknowledge receipt as indicated by the dashed box "Nack". In the event that the data packet D1 is lost, the receiving device does not transmit anything to the transmitting device, and in the event that the receiving device receives the data packet D1, but a transmission error is detected, the receiving device may transmit the "Nack" signal.

Subsequent to the failed re-transmission, the priority of the data packet D1 is set to the highest value, and the transmitting device proceeds to make a re-transmission of the second data packet D1 now with high priority during the second connection event Ci2; however, transmission fails in connection event Ci2. In connection event Ci3, transmission of data packet D1 again fails, but in connection event Ci4, D1 is finally successfully transmitted to the receiving device. Further, a new high priority data packet A2 is transmitted successfully to the receiving device in the same connection event Ci4.

Figure 8:
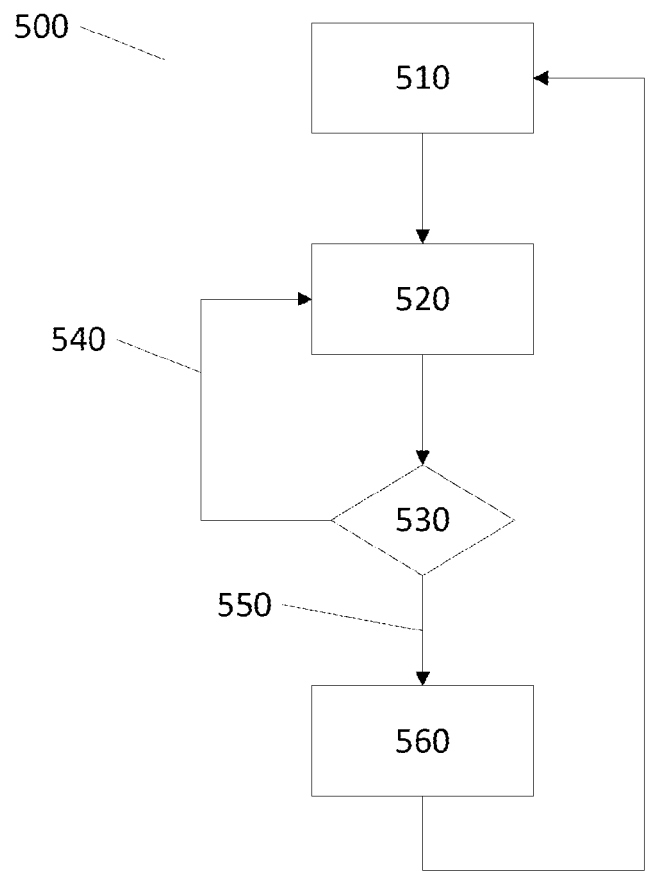
FIG. 8 is a flowchart of an example of the new method.

FIG. 8 shows a flowchart of an example of the new method.

The illustrated method 500 may be utilized for streaming audio, such as speech and/or music, from a transmitter, e.g. accommodated in a smartphone that is configured for operation in compliance with a Bluetooth LE standard protocol, to a receiver, e.g. accommodated in a hearing aid or headphone or another hearing device.

According to the illustrated method 500, when streaming has been requested, the audio data to be streamed are packed into audio data packets, throughout the present disclosure also denoted audio data sets, in accordance with the Bluetooth LE standard protocol, and the audio data packets are accorded a high priority so that transmissions of audio data packets are not prevented by transmissions of other data, such as control data, e.g. a command to turn up the volume of the hearing device.

The audio data packets are transmitted in sequence by

510: establishing one connection event of a sequence of consecutive connection events in compliance with a Bluetooth LE standard protocol, 520: transmitting at least one audio data packet or audio data set of the streamed sequence of audio data packets or audio data sets with the accorded high priority from the transmitter for reception by the receiver, and 530: awaiting acknowledgement of receipt from the receiver, and 540: in absence of an acknowledgement of receipt from the receiver, 520: re-transmitting the at least one audio data packet or audio data set, 550: in presence of the acknowledgement of receipt from the receiver, 560: transmitting a second data packet or data set with a second priority that is lower than the priority having been accorded to the audio data packets, from the transmitter to the receiver when the transmitter would have re-transmitted the at least one audio data packet or audio data set in absence of the acknowledgement.

Preferably, audio data packets of the streamed audio have a high priority ensuring transmission of the audio data packets before transmission of other types of data sets with lower priorities in order to ensure high fidelity, or at least acceptable, quality of sound generated based on the streamed audio.

The method may further comprise allocating L2CAP channels for transmission of audio data sets, e.g. by allocating one L2CAP channel for control data relating to the audio data sets, and/or allocating one L2CAP channel for a first audio data set, and possibly allocating another L2CAP channel for a second audio data set.

Three fixed L2CAP channels may be allocated for audio transport:
1) Control data (start, stop, codec negotiation etc.)
2) Left audio data
3) Right audio data In a device that can receive one audio stream (left or right), e.g. a hearing aid, only channel 1) and 2) or channel 1) and 3) would be in use for that device. In a device with integrated stereo capabilities, e.g. a stereo headset, all three channels are used. The audio data sets can be both unidirectional or bidirectional depending on the application, the control data channel should allow for negotiation on that point.

Figure 9:
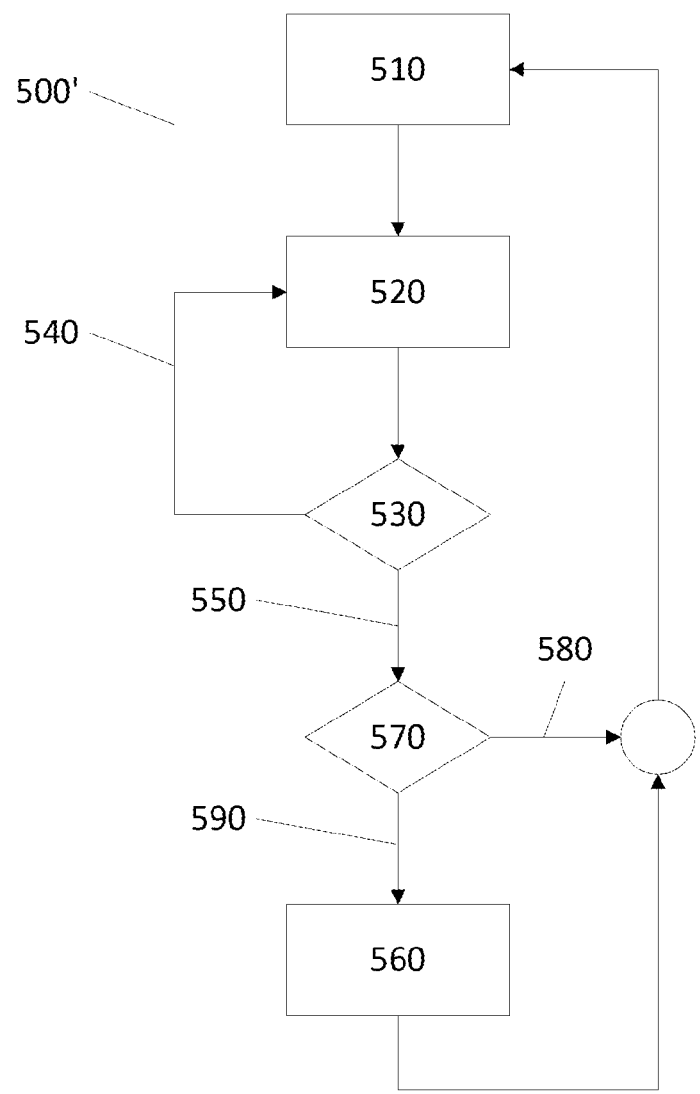
FIG. 9 is a flowchart of another example of the new method.

FIG. 9 shows a flowchart of another example 500' of the new method that in addition to the steps of method 500 illustrated in FIG. 8 includes In step 520: including in the at least one data packet information, e.g. encoded in a data byte, or a data bit, whether or not a data set with the second priority is awaiting transmission to the receiver, and

570: inspecting whether or not a data set with the second priority is awaiting transmission to the receiver, and

580: when no data set with the second priority is awaiting transmission to the receiver, abstaining from establishing the connection between the transmitter and receiver intended for transmission of a second data set with the second priority, and

590: when a data set with the second priority is awaiting transmission to the receiver,

560: transmitting a second data packet or data set with a second priority that is lower than the priority having been accorded to the audio data packets, from the transmitter to the receiver when the transmitter would have re-transmitted the at least one audio data packet or audio data set in absence of the acknowledgement.

Figure 10:
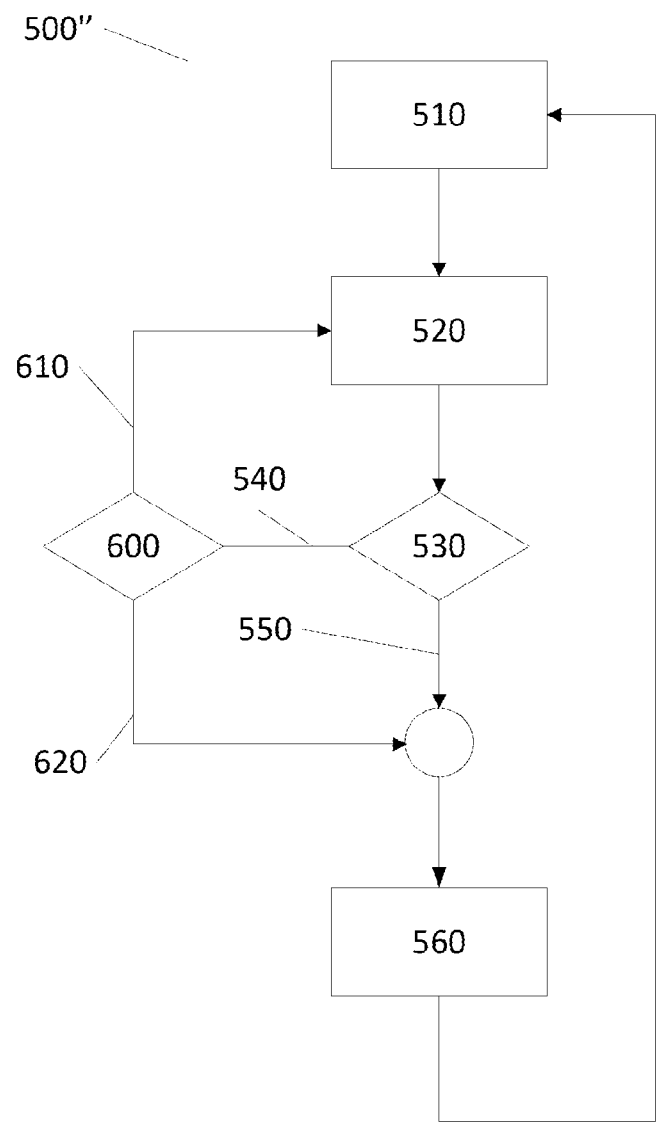
FIG. 10 is a flowchart of yet another example of the new method.

FIG. 10 shows a flowchart of another example 500" of the new method that in addition to the steps of method 500 illustrated in FIG. 8 includes in step 510: Setting a counter of number of attempted re-transmissions of the audio data packet to be transmitted in step 520 to zero, and in step 520: incrementing the counter by one, and

540: in absence of an acknowledgement of receipt from the receiver,

600: inspecting the value of the counter of number of attempted re-transmissions of the audio data packet, and

610: if the value is less than two, 520: incrementing the counter by one, and re-transmitting the at least one audio data packet or audio data set, and

620: if the value is equal to two, 560: transmitting a second data packet or data set with a second priority that is lower than the priority having been accorded to the audio data packets, from the transmitter to the receiver when the transmitter would have re-transmitted the at least one audio data packet or audio data set in absence of the acknowledgement.

Figure 11:
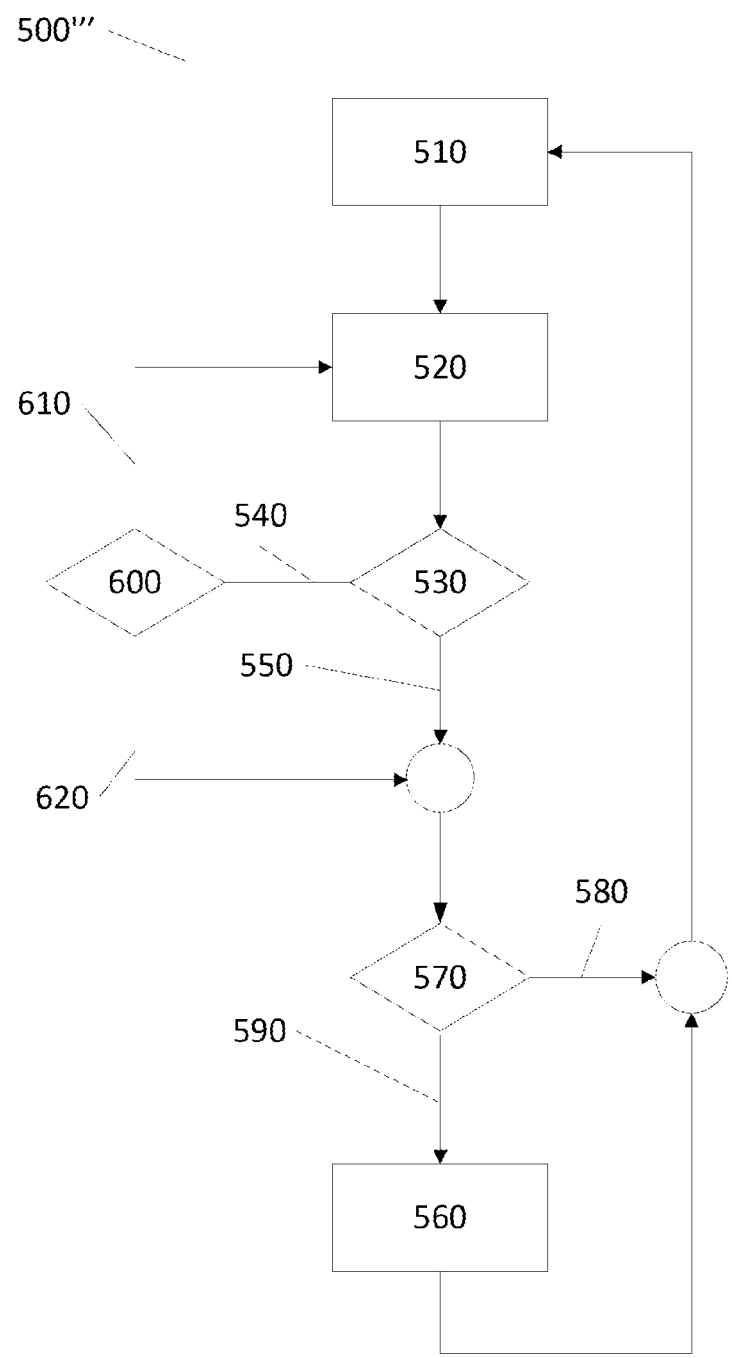
FIG. 11 is a flowchart of still another example of the new method.

The additional method steps 600, 610, and 620 may also be added to the method 500' as shown in FIG. 11 showing a flowchart of yet another example 500''' of the new method.

The allowed number of attempted re-transmissions of other types of data may be different from one or may not be limited, i.e. a maximum value different from two, or no maximum value, or an infinite maximum value, may be allocated to various other types of data.

Different types of data may have different predetermined maximum values of attempted re-transmissions, e.g. audio data sets may have the maximum value two while the maximum value for data sets with a lower priority than the priority of the audio data sets may have larger maximum values.

Advantageously, the illustrated new methods facilitate transmission of audio data packets or sets utilizing Bluetooth LE utilizing extensions of the Bluetooth LE control and link layer in a limited way, e.g. operations relating to security and link setup are performed as specified in Bluetooth core specification.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

The invention claimed is:

1. A method of wireless communication of data sets, comprising:
    transmitting a first data set with a first priority from a transmitter for reception by a receiver, wherein the first data set comprises a data field indicating whether a second data set with a second priority is waiting for transmission; and
    at a time after the first data set is transmitted,
    transmitting the second data set with the second priority that is different from the first priority from the transmitter to the receiver if there is a presence of an acknowledgement of receipt of the first data set from the receiver, and if the data field of the first data set indicates that the second data set is waiting for transmission; and
    when the data field of the first data set indicates that no data in the second data set is awaiting for transmission to the receiver, abstaining from establishing a connection for transmission of the second data set between the transmitter and the receiver.

2. The method according to claim 1, wherein the second priority is lower than the first priority.

3. The method according to claim 1, wherein the transmissions of the first and second data sets, and receptions of the first and second data sets, are in compliance with a Bluetooth low energy standard.

4. The method according to claim 1, further comprising allocating L2CAP channels for the transmission of the first and second data sets.

5. The method according to claim 4, wherein the first data set comprises control data relating to an audio data set.

6. The method according to claim 4, wherein the first data set comprises a first audio data set, and one of the L2CAP channels is allocated for the first audio data set.

7. The method according to claim 6, wherein the second data set comprises a second audio data set, and another one of the L2CAP channels is allocated for the second audio data set.

8. The method according to claim 1, wherein the receiver is a first receiver, and the method further comprises transmitting synchronization data from the transmitter to the first receiver or to the first receiver and a second receiver, the synchronization data containing timing information relating to a transmission delay difference between the first and second receivers.

9. The method according to claim 8, further comprising determining the synchronization data based on ping transmission from the transmitter to the first and second receivers.

10. The method according to claim 9, wherein the ping transmission utilizes a L2CAP control channel.

11. A method of wireless communication of data sets, comprising:
transmitting a first data set of a first data category with a first priority from a transmitter for reception by a receiver, wherein the first data set comprises a data field indicating whether a second data set of a second data category with a second priority is waiting for transmission;
signalling from the transmitter to the receiver, by transmission of the data field, whether or not a data in the second data set is awaiting for transmission to the receiver; and
after the first data set is transmitted, transmitting the second data set of the second data category that is different from the first data category from the transmitter to the receiver if the data field indicates that the second data set is waiting for transmission, wherein the first priority is greater than the second priority such that the transmission of the first data set is prioritized over the transmission of the second data set.

12. The method according to claim 11, wherein information on whether or not the data of the second data set is awaiting transmission to the receiver is encoded into a single data bit.

13. A method of wireless communication of data sets, comprising:
transmitting a first data set of a first data category with a first priority from a transmitter for reception by a receiver; and
at a time after the first data set is transmitted, re-transmitting the first data set if there is an absence of an acknowledgement of receipt from the receiver, wherein the act of re-transmitting the first data set is performed as long as a number of attempted re-transmission(s) of the first data set is below a first predetermined maximum value;
wherein the method further comprises transmitting a second data set of a second data category with a second priority that is different from the first data priority from the transmitter to the receiver, and when no data in the second data set is awaiting for transmission to the receiver, abstaining from establishing a connection for transmission of the second data set between the transmitter and the receiver.

14. The method according to claim 13, wherein the first predetermined maximum value is two.

15. The method according to claim 13, wherein the first predetermined maximum value corresponds with the first data category, and wherein the second data category has a corresponding second predetermined maximum value of attempted re-transmission(s) that is different from the first predetermined maximum value.

16. A hearing device comprising:
a communication controller configured to control a transmitter to transmit a first data set of a first priority for reception by a receiver, the first data set comprising a data field indicating whether a second data set with a second priority is waiting for transmission;
wherein the communication controller is configured to control the transmitter, at a time after the first data set is transmitted,
to transmit the second data set of the second data priority that is different from the first priority to the receiver if there is a presence of an acknowledgement of receipt of the first data set from the receiver, and if the data field indicates that the second data set is waiting for transmission; and
when the data field of the first data set indicates that no data in the second data set is awaiting for transmission to the receiver, to abstain from establishing a connection for transmission of the second data set between the transmitter and the receiver.

17. The hearing device according to claim 16, wherein the hearing device is a hearing aid.

18. A hearing device comprising:
a communication controller configured to control a transmitter to transmit a first data set of a first data category with a first priority for reception by a receiver, wherein the first data set comprises a data field indicating whether a second data set of a second data category with a second priority is waiting for transmission;
wherein the communication controller is configured to control the transmitter to signal to the receiver, by transmission of the data field, whether or not a data in the second data set is awaiting for transmission to the receiver; and
wherein the communication controller is configured to control the transmitter, after the first data is transmitted, to transmit the second data set of the second data category that is different from the first data category to the receiver if the data field indicates that the second data set is waiting for transmission, wherein the first priority is greater than the second priority such that the transmission of the first data set is prioritized over the transmission of the second data set.

* * * * *